United States Patent
Greer et al.

(10) Patent No.: US 7,885,001 B2
(45) Date of Patent: Feb. 8, 2011

(54) TILT LOCK MECHANISM AND METHOD FOR A MOVEABLE OPTICAL OR DISPLAY DEVICE

(75) Inventors: Charles Greer, Bloomington, IN (US); Travis Davis, Loogootee, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 87 days.

(21) Appl. No.: 12/027,572

(22) Filed: Feb. 7, 2008

(65) Prior Publication Data

US 2009/0200447 A1    Aug. 13, 2009

(51) Int. Cl.
*G02B 23/00* (2006.01)
(52) U.S. Cl. .................. 359/409; 359/408; 359/410
(58) Field of Classification Search ................. 248/682; 359/409, 408, 407, 405, 430, 413, 414
See application file for complete search history.

(56) References Cited

U.S. PATENT DOCUMENTS

| | | | |
|---|---|---|---|
| 4,170,792 A * | 10/1979 | Higgs | 2/10 |
| 4,449,787 A | 5/1984 | Burbo et al. | |
| 4,689,834 A | 9/1987 | McCarthy et al. | |
| 5,179,735 A | 1/1993 | Thomanek | |
| 5,506,730 A * | 4/1996 | Morley et al. | 359/815 |
| 5,703,354 A * | 12/1997 | Wannagot et al. | 250/214 VT |
| 5,914,816 A | 6/1999 | Soto et al. | |
| 5,949,575 A * | 9/1999 | Matsumoto | 359/412 |
| 6,457,179 B1 * | 10/2002 | Prendergast | 2/6.2 |
| 6,462,867 B2 | 10/2002 | Choinere | |
| 6,462,894 B1 | 10/2002 | Moody | |
| 6,472,776 B1 | 10/2002 | Soto et al. | |
| 6,493,137 B1 * | 12/2002 | Solinsky et al. | 359/409 |
| 6,662,370 B1 | 12/2003 | Buchanan, Jr. | |
| 6,667,832 B2 * | 12/2003 | Caplan et al. | 359/409 |
| 6,912,727 B2 | 7/2005 | Buchanan, Jr. | |
| 6,924,931 B1 * | 8/2005 | Lam et al. | 359/404 |
| 6,957,449 B2 | 10/2005 | Prendergast | |
| 2005/0111097 A1 * | 5/2005 | Iannarelli et al. | 359/409 |
| 2006/0143764 A1 * | 7/2006 | Reed et al. | 2/6.2 |
| 2007/0012830 A1 * | 1/2007 | Prendergast | 248/200 |

* cited by examiner

*Primary Examiner*—Amy J Sterling
(74) *Attorney, Agent, or Firm*—Christopher A. Monsey

(57) ABSTRACT

An optical device may include at least one optical element and a coupling section adapted to control relative movement between the at least one optical element and the coupling section. The coupling section may include an engaging element and a detent mechanism adapted to adjustably lock the at least one optical element in a plurality of rotational positions. The rotational positions may include rotational positions around a first axis that is substantially perpendicular to a second axis of the at least one optical element, the second axis being a substantially longitudinal axis of the at least one optical element.

15 Claims, 3 Drawing Sheets

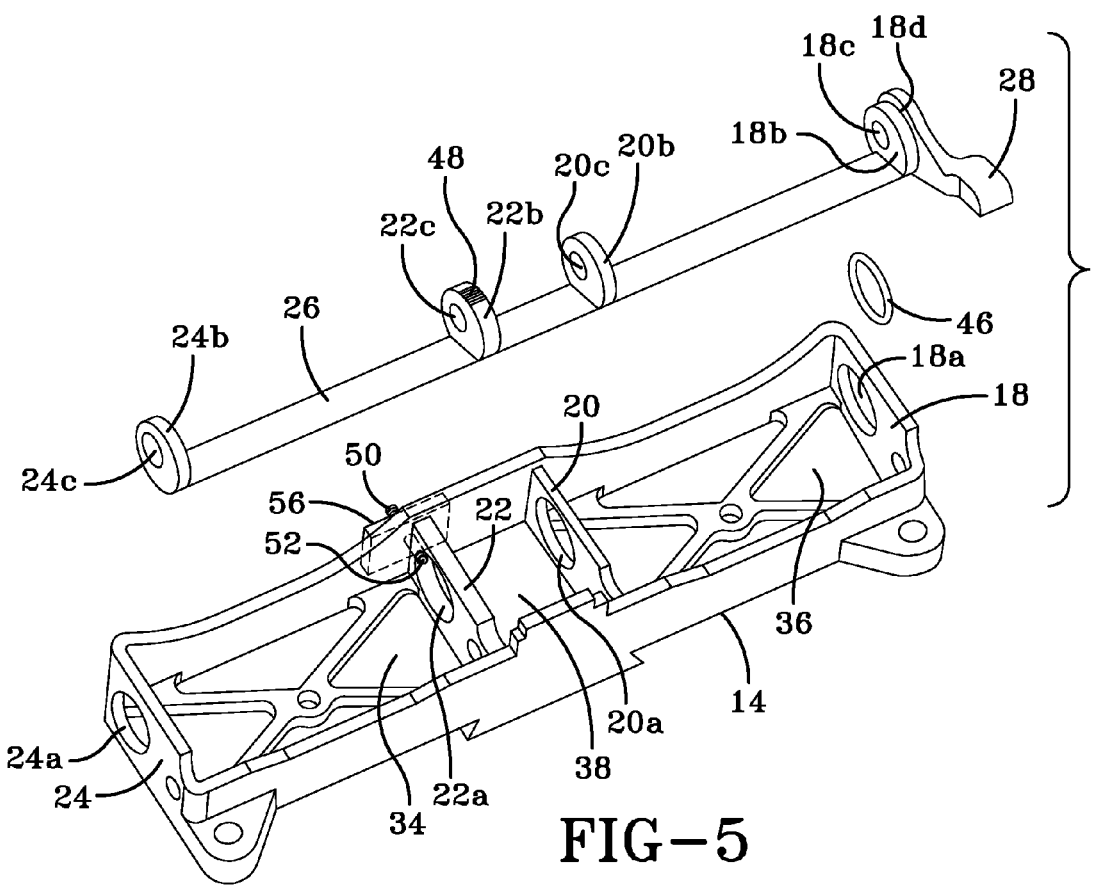
FIG-5
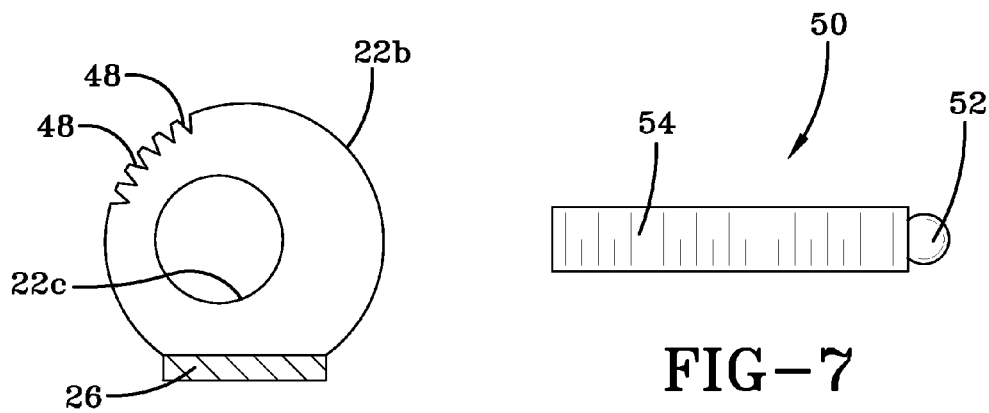
FIG-6
FIG-7

TILT LOCK MECHANISM AND METHOD FOR A MOVEABLE OPTICAL OR DISPLAY DEVICE

STATEMENT REGARDING FEDERALLY SPONSORED RESEARCH OR DEVELOPMENT

The inventions described herein may be manufactured, used and licensed by or for the U.S. Government.

BACKGROUND OF THE INVENTION

The invention relates to tilt lock mechanisms. A need exists to improve locking mechanisms for optical devices based on new designs which correlate eye orientation with exterior objects. For example, virtual reality, head mounted heads up displays/visors or Night Vision Goggles (NVG) worn by airline pilots may be integrated with onboard system. Failure of the NVG to remain locked in a selected position may cause a system to fail to operate or interact with other systems which require a specific orientation, steadiness of the head mounted device or spatial relationship with exterior objects.

SUMMARY OF THE INVENTION

In one aspect, the invention may include at least one optical element and a coupling section adapted to control relative movement between the at least one optical element and the coupling section. The coupling section may include an engaging element and a detent mechanism adapted to adjustably lock the at least one optical element in a plurality of rotational positions. The rotational positions may include rotational positions around a first axis that is substantially perpendicular to a second axis of the at least one optical element, the second axis being a substantially longitudinal axis of the at least one optical element.

The engaging element and the detent mechanism are adapted to allow movement around the first axis when a force is applied to rotate the at least one optical element around the first axis, the force being sufficient to displace a first element of the engaging element and thus permit incremental rotational movement of the at least one optical element.

BRIEF DESCRIPTION OF THE DRAWING

In the drawings, which are not necessarily to scale, like or corresponding parts are denoted by like or corresponding reference numerals.

FIG. 5 is an exploded perspective view of a housing, eccentric shaft, and o-ring.

FIG. 6 is a side view of a flange.

FIG. 7 is a side view of a plunger.

DETAILED DESCRIPTION OF THE PREFERRED EMBODIMENTS

Figure 1:
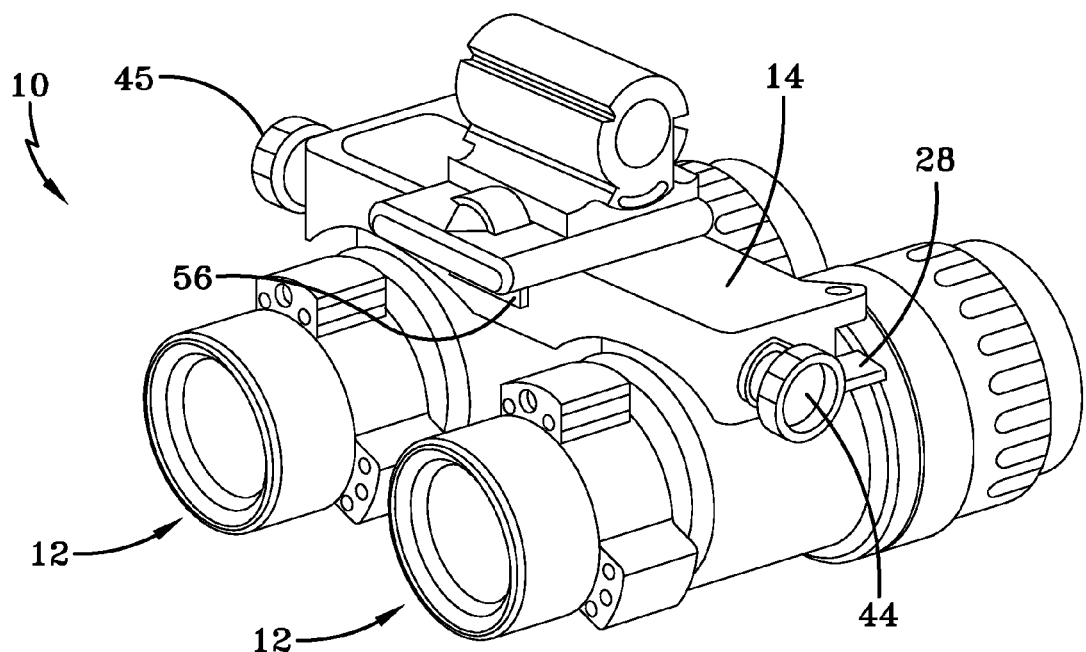
FIG. 1 is a perspective view of a binocular night vision goggle.
Figure 2:
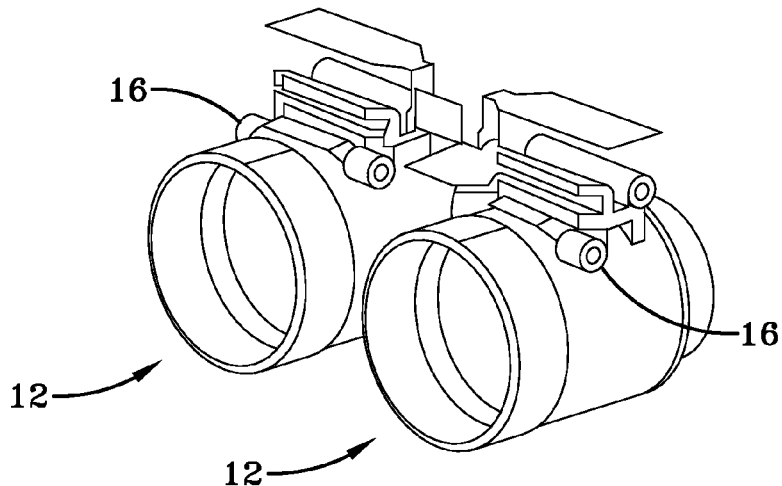
FIG. 2 is a perspective view showing how the binocular night vision assembly is coupled to a housing.

FIG. 1 is a perspective view of a binocular night vision goggle 10. The binocular night vision goggle 10 may use a pair of monocular night vision scopes (optical elements) 12 that may be mounted and associated with one another in such a way as to provide the user of the device 10 with binocular vision. The night vision monoculars 12 may be suspended in front of a user's eyes by an elongated housing (shelf) 14. Housing 14 may have a generally rectangular shape. Depending from the housing 14 may be a pair of spaced apart mounts 16 (FIG. 2) for mounting the monoculars 12.

The interpupillary distance (IPD) is defined as the distance between the user's pupils. To adjust the horizontal spacing between the monoculars 12 to match the IPD of a user, an IPD adjustment mechanism may move the monoculars 12 toward each other and away from each other. Part of the IPD mechanism may be located on the outside of housing 14 and part of it may be located between the walls of housing 14.

Figure 4:
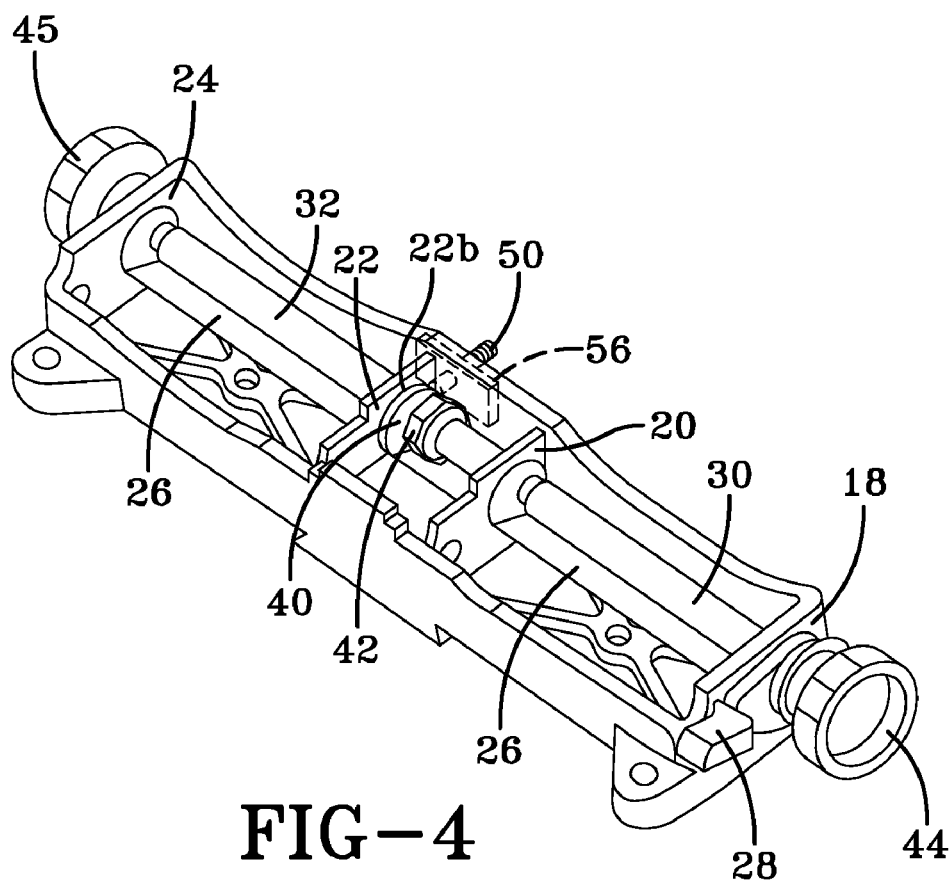
FIG. 4 is a bottom perspective view of a housing for supporting a binocular night vision goggle.

Referring to FIGS. 4 and 5, the bottom of housing 14 may be divided into three sections 34, 36, 38 by four walls 18, 20, 22, and 24. A circular aperture may be located inside each of the walls 18, 20, 22, 24. Aperture 18a may be located in wall 18, aperture 20a may be located in wall 20, aperture 22a may be located in wall 22, and aperture 24a may be located in wall 24.

Flanges 18b, 20b, 22b, and 24b of an eccentric shaft 26 may be rotatably received in the apertures 18a, 20a, 22a, 24a. Eccentric shaft 26 may be a thin elongate blade member. Inside each of the flanges 18b, 20b, 22b, 24b may be off-center apertures 18c, 20c, 22c, and 24c. A pivot lever 28 of the eccentric shaft 26 may be part of flange 18b and may extend outwardly of one end of the housing 14.

Rotatably received in apertures 18c and 20c may be an IPD threaded shaft 30. A monocular 12 (FIGS. 1 and 2) may be mounted onto IPD threaded shaft 30. One end of IPD threaded shaft 30 may extend through aperture 18c in flange 18b, which may be in aperture 18a of wall 18. Consequently, this end of IPD threaded shaft 30 may extend from the space in section 36 at the underside of housing 14 to the outside of wall 18. The other end of IPD threaded shaft 30 may extend through aperture 20c in flange 20b, which may be in aperture 20a of wall 20. Consequently, this end of IPD threaded shaft 30 may extend from space 36 at the underside of housing 14 into the space in section 38 at the underside of housing 14.

Rotatably received in apertures 22c and 24c may be an IPD threaded shaft 32. Another monocular 12 (FIGS. 1 and 2) may be mounted onto IPD threaded shaft 32. One end of IPD threaded shaft 32 may extend through aperture 24c in flange 24b, which may be in aperture 24a of wall 24. Consequently, this end of IPD threaded shaft 32 may extend from the space in section 34 at the underside of housing 14 to the outside of wall 24. The other end of IPD threaded shaft 32 may extend through aperture 22c in flange 22b, which may be in aperture 22a of wall 22. Consequently, this end of IPD shaft 32 may extend from space 34 at the underside of housing 14 into the space in section 38 at the underside of housing 14.

The end of IPD threaded shaft 32 that may extend into space 38 from space 34 may be threaded and may carry a washer member 40 which may be secured axially on the IPD threaded shaft 32 by a threaded nut 42. Consequently, IPD threaded shaft 32 may not move out of aperture 22c in flange 22b. The end of IPD threaded shaft 30 that may extend into space 38 from space 36 may be threaded and may carry a washer member (not shown) which may be secured axially on the IPD threaded shaft 30 by a threaded nut (not shown). Consequently, IPD threaded shaft 30 may not move out of aperture 20c in flange 20b.

The end of IPD threaded shaft 32 that may extend from space 34 to the outside of wall 24 may be attached to a control knob 44. The end of IPD threaded shaft 30 that may extend from space 36 to the outside of wall 18 may be attached to a control knob 45. Each of the monoculars 12 may be respectively coupled to the IPD shafts 30 and 32. Control knobs 44 and 45 may be rotated independently of each other. When control knobs 44 and 45 are rotated, they may respectively cause IPD shafts 30 and 32 to rotate thereby moving the monoculars 12 toward and away from each other to adjust for varying eye separations.

As explained above, lever 28 may be part of flange 18b. Each of the flanges 18b, 20b, 22b, 24b may be connected together by the eccentric shaft 26. Each of the flanges 18b, 20b, 22b, 24b may have an off-center aperture. Off-center apertures 18c and 20c may receive IPD threaded shaft 30 and off-center apertures 22c and 24c may receive IPD threaded shaft 32. Rotation of lever 28 may rotate eccentric shaft 26 and flanges 18b, 20b, 22b, 24b, shaft 30 and shaft 32 relative to housing 14.

Because the monoculars 12 may be coupled to shafts 30 and 32, rotation of lever 28 may tilt each of the monoculars 12 relative to housing 14 and relative to a user's eyes. Thus, the eccentric shaft 26 and its associated flanges provide a means of tilting the line-of-sight (longitudinal axis) of the two monoculars 12 simultaneously. The lever 28 may be used to adjust the tilt of the monoculars 12 to align with the user's line-of-sight. That is, the lever 28 may be used to rotate the monoculars 12 about an axis that is substantially perpendicular to the longitudinal axis through the monoculars 12.

As shown in FIG. 5, the eccentric shaft 26 may use an o-ring 46 to provide rotational friction between the eccentric shaft 26 and the housing 14. The o-ring 46 may be placed in a groove 18d of flange 18b, near adjustment lever 28. After the eccentric shaft 26 is assembled to the housing assembly, the o-ring 46 may provide frictional resistance against the housing 14. The rotational friction force may occur between o-ring 46 and aperture 18a of wall 18 when flange 18b is inserted into aperture 18a. Thus, the o-ring 46 may act as a frictional resistor between the eccentric shaft 26 and the housing 14.

The frictional interface between o-ring 46 and aperture 18a may be controlled by tight tolerances between flange 18b of the eccentric shaft 26, the housing 14, and the o-ring 46. The o-ring 46 may provide some rotational friction for shaft 26. Further rotational friction and a tilt adjustment lock may be provided by a plunger and detent mechanism.

FIG. 6 is an enlarged, side view of flange 22b shown in FIG. 5. Flange 22b may include a plurality of detents 48 formed on its circumference. Detents 48 may be in the form of, for example, dimples, grooves, etc. As shown in FIG. 6, detents 48 may comprise substantially V-shaped grooves that extend transversely across the width of the flange 22b. The sides of the V-shaped grooves may form about a 45 degree angle. Each detent 48 may correspond to a locked position of the device 10. The number of detents 48 may vary depending on the number of locked positions desired. The circumferential extent and spacing of the detents 48 may vary depending on the range and precision of tilt adjustment desired. In one embodiment, six detents 48 are circumferentially spaced about 10 degrees apart to produce six locked settings over a sixty degree range of tilt.

Figure 3:
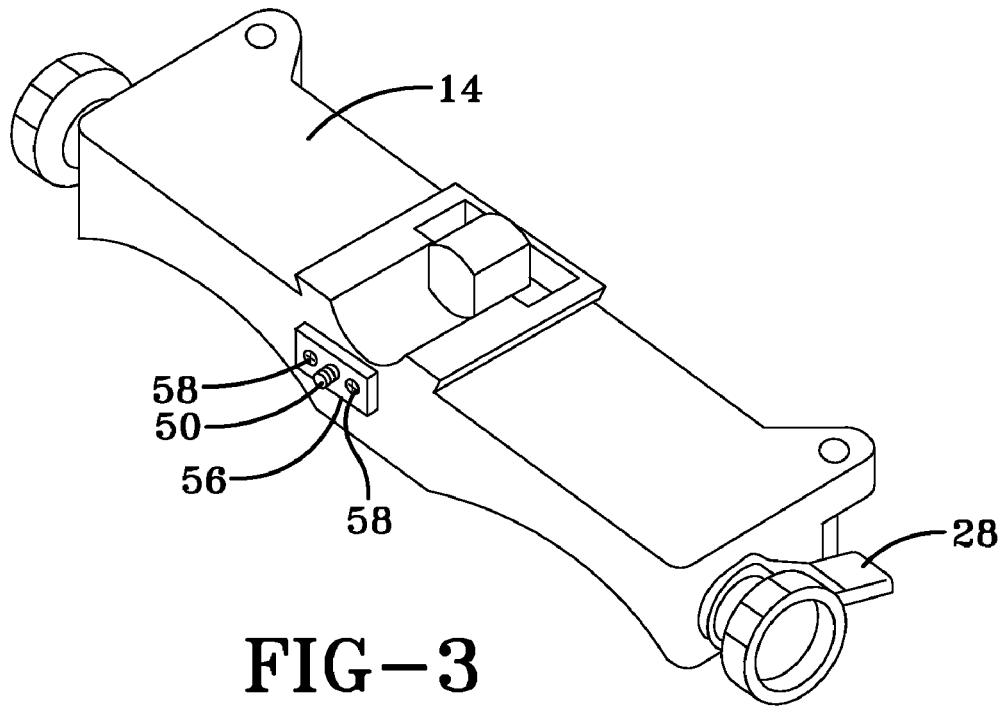
FIG. 3 is a top perspective view of a housing for supporting a binocular night vision goggle.

FIG. 7 is an exemplary enlarged, side view of a plunger 50 shown in FIGS. 3-5. Plunger 50 may include a first element comprising a tip 52 for engaging the detents 48. Tip 52 may be spherical. Tip 52 is outwardly biased by an internal spring (not shown) in plunger 50. Plunger 50 may include threads 54 for threading into housing 14. The thickness of housing 14 in the vicinity of plunger 50 may be increased by mounting an exterior plate 56 (FIGS. 3-5) to housing 14 using, for example, fasteners 58, plastic welding, adhesives, etc.

Plunger 50 may be mounted to housing 14 such that the tip 52 abuts a detent 48 in flange 22b. As shown in FIG. 5, the tip 52 may be located at wall 22.

As lever 28 (FIGS. 4 and 5) is rotated, shaft 26 with flange 22b rotates. As flange 22b rotates, the tip 52 of plunger 50 moves in and out of the detents 48 due to the spring in the plunger 50. When the desired tilt position is reached, the tip 52 seats in the chosen detent 48 and locks the device 10 in position. The force required to rotate lever 28 to change tilt positions may be altered by, for example, changing the spring force in the plunger 50. In one embodiment, the plunger 50 is a 4 millimeter diameter plunger with a spring force in the range of about 2.5 Newtons minimum (uncompressed) to about 12.5 Newtons maximum (fully compressed). Of course, other spring forces may be used. The spring force may be small enough to allow one-handed adjustment by the user, yet large enough to prevent movement of the optical elements caused by, for example, vibration.

Another way to adjust the spring force is to move the entire plunger 50 toward or away from the detents 48. If the plunger 50 is threaded into the housing 14, the plunger may be adjusted by threading it into or out of the housing 14. Of course, the tip and internal spring must have sufficient travel to bear against the detents 48 and also be retracted into the plunger 50 as the shaft 26 rotates.

The tilt adjustment and lock mechanism has been described with reference to a night vision goggle. However, the inventive mechanism may be incorporated into a variety of optical devices and may be used for adjustments other than tilt.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An optical device, comprising:
at least one optical element; and
a coupling section adapted to control relative movement between said at least one optical element and said coupling section, said coupling section comprising an engaging element and a detent mechanism adapted to adjustably lock said at least one optical element in a plurality of rotational positions around a first axis that is substantially perpendicular to a second axis of said at least one optical element wherein said engaging element comprises a first and second element, said second axis comprising a substantially longitudinal axis of said at least one optical element, wherein said engaging element and said detent mechanism are adapted to allow movement around said first axis when a force is applied to rotate said at least one optical element around said first axis, said force being sufficient to displace said first element of said engaging element and thus permit incremental rotational movement of said at least one optical element, wherein said first element of said engaging element comprises a tip that is removably disposable in said plurality of detents, wherein said engaging element is adapted to be removable from said optical device and adjustable such that said second element of said engaging element is adapted to be selectively positioned to move said first element closer to or farther from said detent mechanism and thereby selectively increase or decrease a compressive or recovery force exerted on said detent mechanism by said first element;

said detent mechanism further comprises an aperture formed through said detent mechanism parallel with said first axis, said aperture is formed in said detent mechanism such that an outer surface of said detent mechanism defines an eccentric rotation around said first axis when said detent mechanism is rotated around said first axis and thereby positions said plurality of detents closer or farther away from said engaging element.

2. The optical device of claim 1 further comprising a first member rotatably supported by said coupling section and a frictional member adapted to restrict relative movement between said coupling section and said first member, said first member including said detent mechanism.

3. The optical device of claim 2 wherein said detent mechanism comprises a curved surface of said first member, said curved surface including a plurality of detents formed thereon and circumferentially spaced apart.

4. The optical device of claim 3 wherein said first member is a generally elongated member that includes a pivot lever.

5. The optical device of claim 4 wherein said at least one optical element is fixed to said first member for rotation with said first member.

6. The optical device of claim 5 wherein said coupling section comprises a housing, said engaging element is fixed to said housing.

7. The optical device of claim 6 wherein said coupling section comprises a shelf.

8. The optical device of claim 3 wherein said plurality of detents comprise generally V-shaped grooves.

9. The optical device of claim 6 wherein said tip is generally spherical.

10. The optical device of claim 1 wherein said optical device is a night vision goggle.

11. The optical device of claim 10 wherein said at least one optical element comprises two night vision monoculars.

12. The optical device of claim 3 wherein said curved surface comprises a flange.

13. The optical element of claim 6 wherein said engaging element adjustably engages said coupling section with threads.

14. An optical device as in claim 1, wherein said second element of said engaging element is formed with a plurality of threads on an outer surface of said second element which are adapted to be removably and selectively received into a threaded aperture adapted to receive said engaging element in a housing portion of said optical device.

15. An optical device as in claim 1, further comprising a longitudinal assembly having at least one section formed into a cylindrical form, said longitudinal assembly is disposed within said aperture of said detent mechanism, said longitudinal assembly also is formed such that said longitudinal assembly extends through apertures formed in opposing sides of said coupling section, said section formed into a cylindrical form is further formed with threads, said at least one optical element is coupled to said section formed into a cylindrical form such that rotation of said longitudinal assembly moves said at least one optical element laterally along a long axis of said longitudinal assembly.

* * * * *